United States Patent
Ren et al.

(10) Patent No.: US 10,627,318 B2
(45) Date of Patent: Apr. 21, 2020

(54) MECHANICAL HANDHELD HERMATIC SAMPLER FOR MARINE SEDIMENT AND SAMPLING, PRESSURE MATAINING METHOD THEREOF

(71) Applicants: Shanghai Jiao Tong University Underwater Engineering Institute Co., Ltd, Shanghai (CN); Hunan University of Science and Technology, Xiangtan, Hunan (CN)

(72) Inventors: Ping Ren, Shanghai (CN); Buyan Wan, Hunan (CN); Xiafei Ma, Shanghai (CN); Yongping Jin, Hunan (CN); Youduo Peng, Hunan (CN)

(73) Assignees: Shanghai Jiao Tong University Underwater Engineering Institute Co., Ltd, Shanghai (CN); Hunan University of Science and Technology, Xiangtan, Huan (CN)

( * ) Notice: Subject to any disclaimer, the term of this patent is extended or adjusted under 35 U.S.C. 154(b) by 12 days.

(21) Appl. No.: 16/109,968

(22) Filed: Aug. 23, 2018

(65) Prior Publication Data
US 2019/0234835 A1    Aug. 1, 2019

(30) Foreign Application Priority Data
Jan. 31, 2018 (CN) .......................... 2018 1 0093133

(51) Int. Cl.
*G01N 1/08* (2006.01)
*G01N 1/10* (2006.01)

(52) U.S. Cl.
CPC ....... *G01N 1/08* (2013.01); *G01N 2001/1031* (2013.01)

(58) Field of Classification Search
CPC ...... G01N 1/08; G01N 1/12; G01N 2001/085; G01N 2001/1031; G01N 1/14; E21B 25/18
See application file for complete search history.

(56) References Cited

U.S. PATENT DOCUMENTS

| | | | | |
|---|---|---|---|---|
| 3,302,464 A | * | 2/1967 | Langguth | ................. G01N 1/14 73/864.64 |
| 3,497,018 A | * | 2/1970 | Gibson | ................... E21B 7/124 175/6 |
| 3,531,995 A | * | 10/1970 | Barker | ..................... G01N 1/12 73/864.62 |

\* cited by examiner

*Primary Examiner* — Justin N Olamit
(74) *Attorney, Agent, or Firm* — Wayne & Ken, LLC; Tony Hom

(57) ABSTRACT

Provided is a mechanical handheld hermetic sampler for marine sediment. The sampler comprises sampling assembly and a pressure maintaining assembly. The sampling assembly includes a sampling tube, a handle and an end cap. The sampling tube is fixed at a lower end surface of the end cap while the handle is fixed at an upper end surface of the end cap. The handheld robotic sampler for marine sediment with hermetic sampling is simple and compact in structure, small in size, light in weight, easy to manipulate and manufacture, highly reliable, and particularly suitable for robotic sampler hand control of underwater operating equipment such as a manned submersible, an unmanned submersible and Remotely Operated Vehicle.

6 Claims, 4 Drawing Sheets

MECHANICAL HANDHELD HERMATIC SAMPLER FOR MARINE SEDIMENT AND SAMPLING, PRESSURE MATAINING METHOD THEREOF

CROSS-REFERENCE TO RELATED APPLICATIONS

This application claims to Chinese application No. 201810093133.6 with a filing date of Jan. 31, 2018. The content of the aforementioned applications, including any intervening amendments thereto, are incorporated herein by reference.

FIELD OF THE INVENTION

The present disclosure relates to a submarine sampling device, in particular to a handheld robotic sampler for marine sediment with hermetic sampling and a method for sampling and pressure maintaining thereof.

BACKGROUND OF THE INVENTION

The ocean is a huge treasury of human resources, which is rich in minerals, organisms, oil and gas and many other resources. There are a large number of living communities such as microorganisms in marine sediments. These microbial communities are of great importance for humans to understand and study the the abyss of live evolution and the changes of the submarine environment. Due to the hyperbaric environment of the seafloor, fluctuations in the external environmental pressure for the microorganisms must be minimized so as to avoid the influence of external pressure changes on the vital signs of the barophile during the sediment sampling. However, at present, handheld robotic sampler for marine sediment such as the "Jiaolong" manned submersible and "Haima" ROV are non-hermetic pressure maintaining ones, which have a great influence on research on vital signs of barophile. Therefore, a handheld robotic sampler for marine sediment with hermetic sampling must be developed to provide high-quality submarine pressure maintaining samples for scientific research such as evolution of the submarine microbial community.

SUMMARY OF THE PRESENT INVENTION

In order to solve the above-mentioned technical problems, the present disclosure provides a handheld robotic sampler for marine sediment with hermetic sampling which is simple and compact in structure, easy to operate and highly reliable, and a method thereof for sampling and pressure maintaining.

The technical solution of the disclosure is as follows: a handheld robotic sampler for marine sediment with hermetic sampling, including a sampling assembly and a pressure maintaining assembly. The sampling assembly includes a sampling tube, a handle and an end cap. The sampling tube is fixed at a lower end surface of the end cap and the handle is fixed at an upper end surface of the end cap. A side wall of a top of the sampling tube is provided with a plurality of drainage holes and the sampling tube is inserted into the pressure maintaining assembly. A sealed junction is provided between the end cap and the pressure maintaining assembly.

Further, the pressure maintaining assembly includes a pressure maintaining cylinder, square blocks, floating sealing rings and a sample discharging valve. A side wall of a top of the pressure maintaining cylinder is provided with a plurality of square block holes which are provided along a radial direction of the pressure maintaining cylinder. And each of the square blocks is respectively provided in each of the square block holes, block casings are fixed on an outer wall of the pressure maintaining cylinder corresponding to the square blocks, and the square blocks are connected with the block casing through compression springs, so that the square blocks elastically stretch and retract in the square block holes along a radial direction of the pressure maintaining cylinder.

An upper end of an inner side wall of the pressure maintaining cylinder is provided with a stepped surface, and the stepped surface is provided with a plurality of blinded spring holes. The axes of the spring holes are parallel to the axis of the pressure maintaining cylinder. Floating support springs are fixed in the spring holes, and the floating sealing rings are supported on the floating support springs. A radial sealing gasket is provided between each of the floating sealing rings and an inner wall of the pressure maintaining cylinder. The square blocks are located above the floating sealing rings. The end cap is engaged between the square blocks and the floating sealing rings, and a bottom of an inner chamber of the pressure maintaining cylinder is connected to the sample discharging valve through a first pressure-resistant tube.

Further, limit pins are provided on a side face of the square blocks close to the block casing to prevent the square blocks from completely sliding into the square block holes under the action of the compression springs. And an axial sealing gasket is mounted on an upper end surface of the floating sealing ring.

Further, the handheld robotic sampler for marine sediment with hermetic sampling further includes a pressure compensator. The pressure compensator includes a pressure-resistant cylinder, a piston, a compensator end cap and an inflation valve. One end of the pressure-resistant cylinder is open and the other end thereof is provided with a first connecting hole which is in communication with the pressure maintaining cylinder. The compensator end cap is fixed at the open end of the pressure-resistant cylinder, and is provided with a second connecting hole. The inflation valve is in communication with the second connecting hole through a second pressure-resistant tube. And the piston is mounted within the pressure-resistant cylinder.

A method for sampling and pressure maintaining of marine sediment using the handheld robotic sampler for marine sediment with hermetic sampling, wherein the specific steps are as follows:
 (1) grasping the handle of the sampling assembly, and moving the sampling assembly to a position perpendicular to a surface of the marine sediment;
 (2) pressing the sampling assembly into the marine sediment until the sampling tube is completely inserted into the marine sediment, and discharging the seawater in the sampling tube through the drainage holes during insertion of the sampling tube into the marine sediment;
 (3) pulling the sampling tube out of the marine sediment and inserting it into the pressure maintaining assembly.

In the method for sampling and pressure maintaining of marine sediment stated above, the step of inserting the sampling assembly into the pressure maintaining assembly in step 3) is as follows:
 aligning the sampling tube with the pressure maintaining cylinder, then slowly inserting the sampling tube into the pressure maintaining tube, and continuing to press the sampling assembly after the sampling cylinder is fully inserted into the pressure maintaining tube, so that the end cap of the sampling assembly slides over the square block. A seal is provided between the lower end surface of the end cap and the floating sealing ring by the axial sealing gasket, and the square blocks are ejected by the compression springs and clamp the upper end of the end cap.

In the method for sampling and pressure maintaining of marine sediment stated above, before the handheld robotic sampler for marine sediment with hermetic sampling is launched, a chamber clearance between the piston of the pressure compensator and the compensator end cap is filled with inert gas through the inflation valve, such that the piston is located at a top position of an inner chamber of the pressure-resistant cylinder.

Compared with prior art, the beneficial effects of the disclosures are as follows:

The handheld robotic sampler for marine sediment with hermetic sampling of the disclosure is simple and compact in structure, small in size, light in weight, easy to manipulate and manufacture, highly reliable, and particularly suitable for robotic sampler hand control of underwater operating equipments such as a manned submersible, an unmanned submersible and ROV.

DETAILED DESCRIPTION OF ILLUSTRATED EMBODIMENTS

The disclosure will now be further described with reference to the accompanying drawings.

Figure 1:
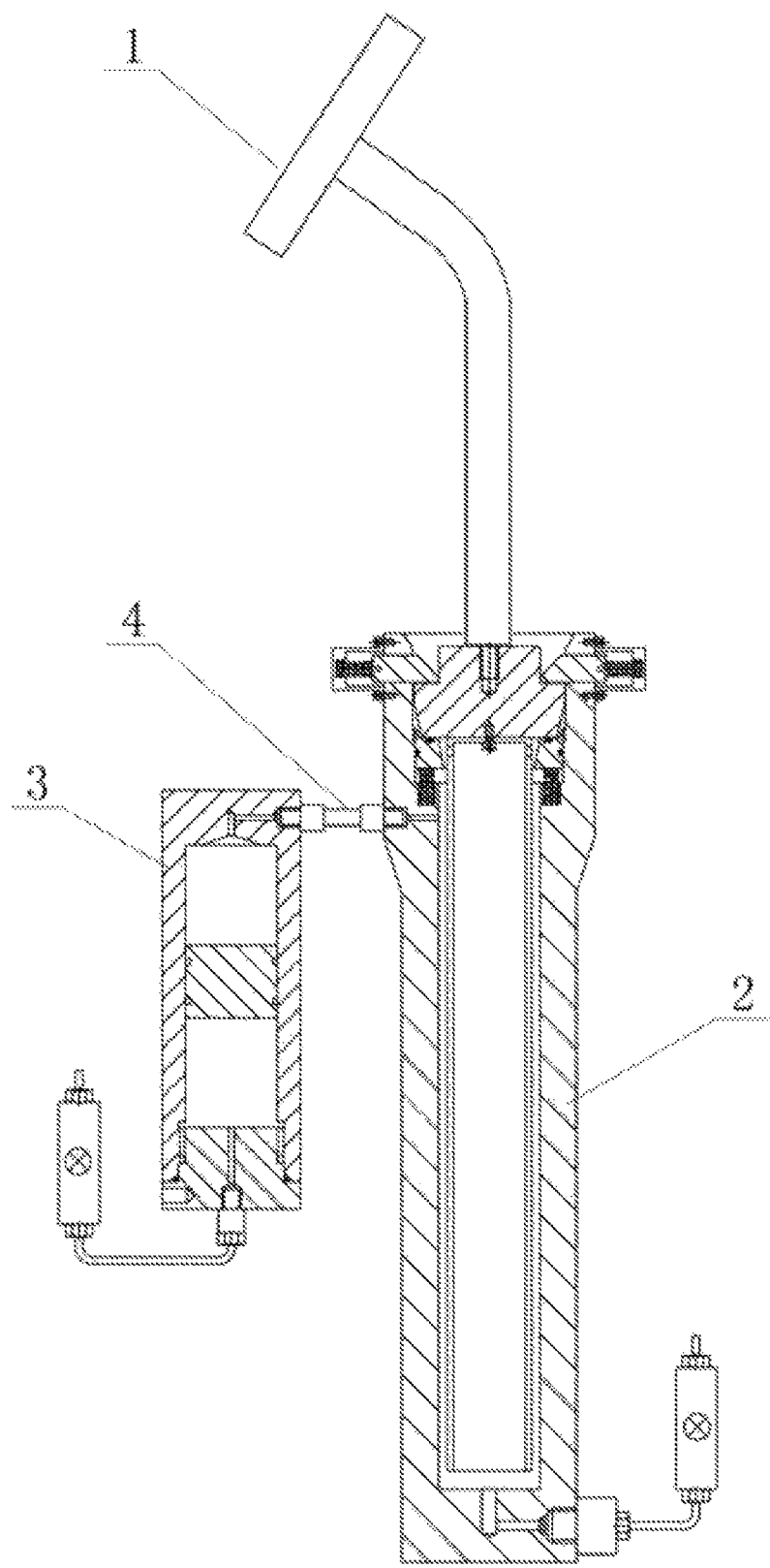
FIG. 1 is a structural schematic view of the handheld robotic sampler for marine sediment with hermetic sampling of the present disclosure.
Figure 2:
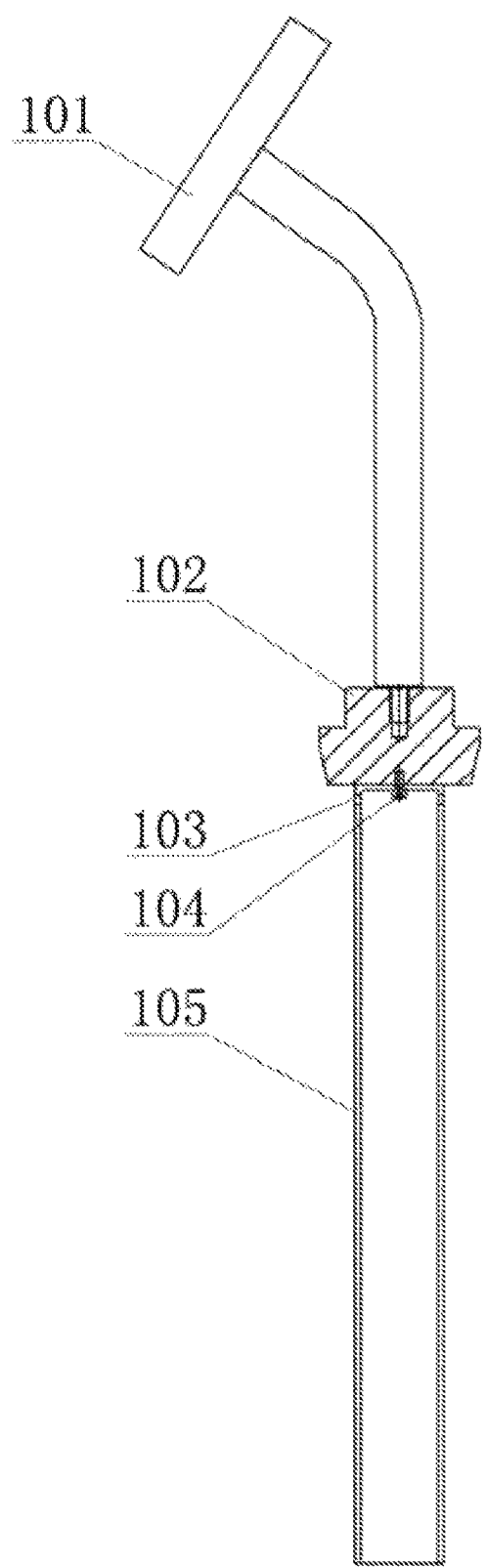
FIG. 2 is a structural schematic view of the sampling assembly of the handheld robotic sampler for marine sediment with hermetic sampling of the present disclosure.

As shown in FIG. 1, the present disclosure includes a sampling assembly 1, a pressure maintaining assembly 2, a pressure compensator 3, and a high pressure tube 4. As shown in FIG. 2, the sampling assembly 1 includes a sampling tube 105, a handle 101 and an end cap 102. The top of the sampling tube 105 is fixed at the lower end surface of the end cap 102 by a first screw 104, and the handle 101 is fixed at the upper end surface of the end cap 102 and is provided for mechanical gripping. The side wall of the top of the sampling tube 105 is provided with a plurality of drainage holes 103 for discharging seawater in the sampling tube 105 during sampling.

Figure 3:
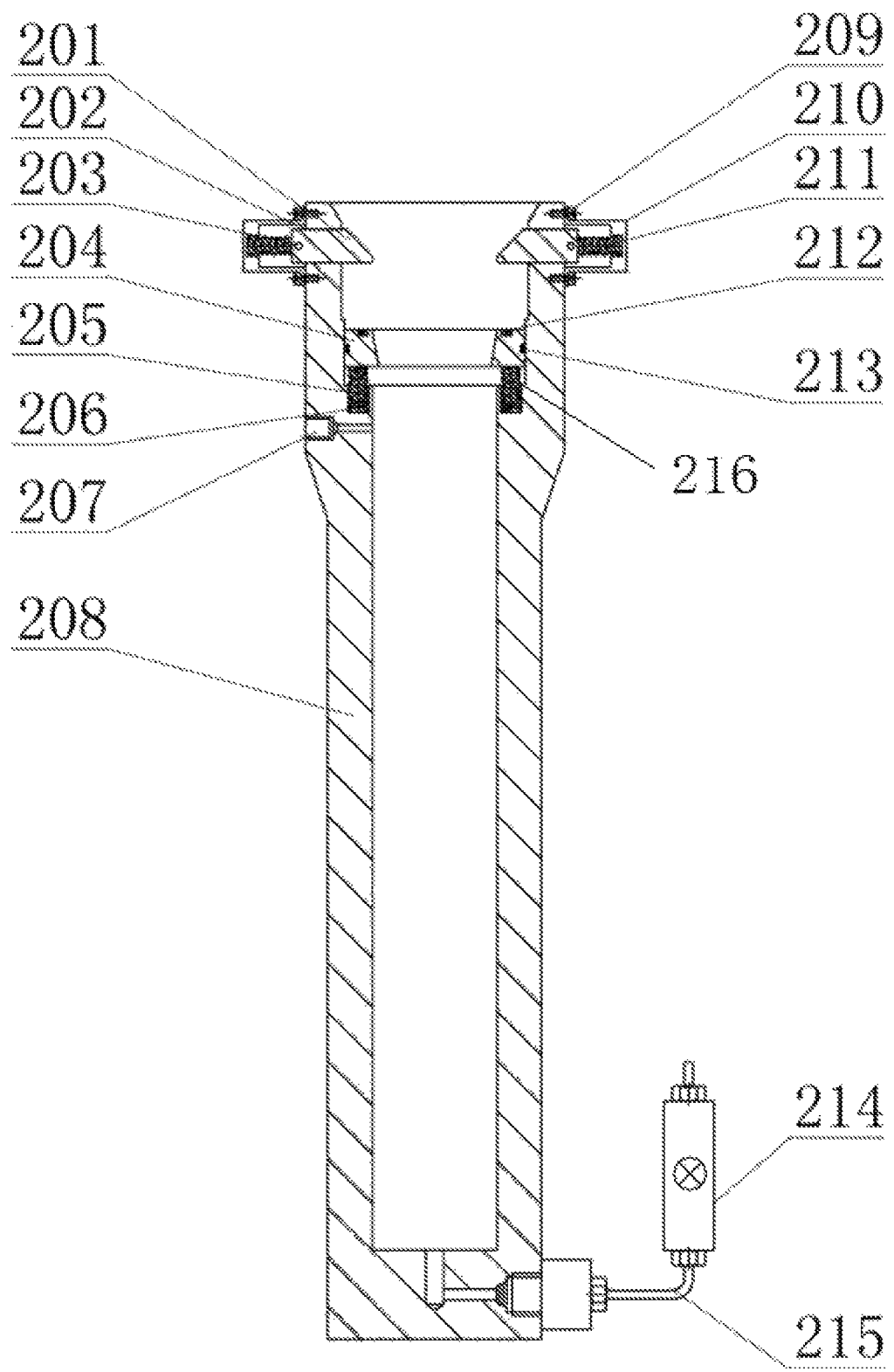
FIG. 3 is a structural schematic view of the pressure maintaining assembly of the handheld robotic sampler for marine sediment with hermetic sampling of the present disclosure.

As shown in FIG. 3, the pressure maintaining assembly 2 includes a pressure maintaining cylinder 208, square blocks 201, floating sealing rings 204, and a sample discharging valve 214. A plurality of square block holes 202 are provided on the top side wall of the pressure maintaining cylinder 208. The square block holes 202 are provided in the radial direction, and each of the square block holes 202 is respectively provided with a square block 201. Limit pins 203 are fixed on a side face of the square block 201 close to the rear end. Block casing 210 is fixed on an outer wall of the pressure maintaining cylinder 208 corresponding to the square blocks 201 by a second bolt 209. The end surfaces of the square blocks 201 and the block casing 210 which are opposite to each other are connected by compression springs 211, and the square blocks 201 can move in the square block holes 202 under the action of the compression springs 211.

The upper part of the pressure maintaining cylinder 208 is provided with a high pressure tube connecting hole 207. The inner holes of the pressure maintaining cylinder 208 are step holes. The upper end of the inner side wall of the pressure maintaining cylinder 208 is provided with a stepped surface 216, and the stepped surface 216 is provided with a plurality of spring holes 206 which are blind holes and the axes of which are parallel to the axis of the pressure maintaining cylinder 208. Floating support springs 205 are respectively fixed in the spring holes 206, and the floating sealing rings 204 are supported on the floating support springs 205. A radial sealing gasket 213 and an axial sealing gasket 212 are respectively provided in the radial direction and the axial direction on each floating sealing ring 204, and the radial sealing gasket 213 is provided to seal between each floating sealing ring 204 and the inner wall of the pressure maintaining cylinder 208. The square blocks 201 are located above the floating sealing rings 205, and the end cap 102 is fastened between the square blocks 201 and the floating sealing rings 205. The bottom of the inner chamber of the pressure maintaining cylinder 208 is connected to the sample discharging valve 214 through a pressure-resistant tube 215.

Figure 4:
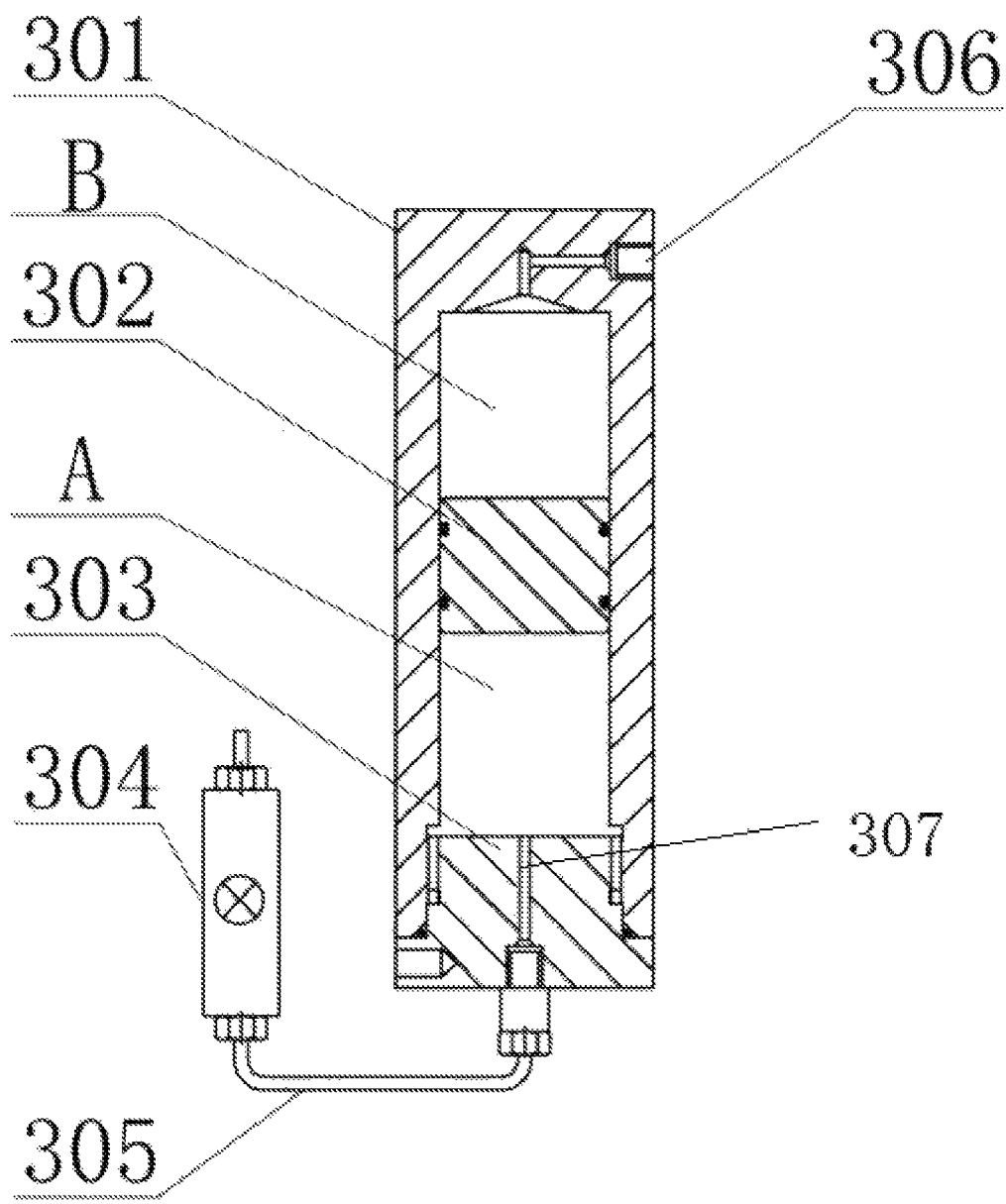
FIG. 4 is a structural schematic view of the pressure compensator of the handheld robotic sampler for marine sediment with hermetic sampling of the present disclosure.

As shown in FIG. 4, the pressure compensator 3 includes a pressure-resistant cylinder 301, a piston 302, a compensator end cap 303, and an inflation valve 304. One end of the pressure-resistant cylinder 301 is open, and the other end thereof is provided with a first connecting hole 306 which is in communication with the pressure maintaining cylinder 208. The first connecting hole 306 is connected to the high pressure tube connecting hole 207 on the pressure maintaining cylinder 208 through a high pressure tube 4. The compensator end cap 303 is fixed at the open end of the pressure-resistant cylinder 301, and the compensator end cap 303 is provided with a second connecting hole 307. The inflation valve 304 is in communication with the second connecting hole 307 through a second pressure-resistant tube 305. The piston 302 is mounted within the pressure-resistant cylinder 301, and the piston 302 divides the pressure-resistant cylinder 301 into a chamber A (a clearance between the piston 302 and the compensator end cap 303) and a chamber B (a clearance between the piston 302 and the pressure-resistant cylinder 301). The chamber A is in communication with the inflation valve 304 through the pressure-resistant tube 305, and the chamber B is in communication with the pressure maintaining cylinder 208 through the high pressure tube 4.

When the sampling tube 105 of the sampling assembly 1 is inserted into the pressure maintaining cylinder 208 of the pressure maintaining assembly 2, the axial sealing gasket 212 is provided to seal between the lower end surface of the end cap 102 of the sampling assembly 1 and the floating sealing ring 204 of the pressure maintaining assembly 2. At the same time, the square block 201 of the pressure maintaining cylinder 208 fastens the upper end surface of the end cap 102 of the sampling assembly 1, and the movement of the end cap 102 of the sample tube assembly 1 is restricted, so that a hermetic structure is formed among the sampling assembly 1, the pressure maintaining assembly 2, the pressure compensator 3 and the high pressure tube 4.

The disclosure further provides a method for sampling and pressure maintaining of marine sediment samples using the above-mentioned handheld robotic sampler for marine sediment with hermetic sampling, and the method includes steps as follows.

(1) Before the handheld robotic sampler for marine sediment with hermetic sampling is launched, the chamber A of the pressure compensator 3 is pre-charged with inert gas of certain pressure through the inflation valve 304, and at this time the piston 302 is moved to the chamber B and reach a top position of the chamber B; during the process of the handheld robotic sampler hermetic sampling device for marine sediment lowering towards the seafloor, the piston 302 will move to the chamber A under the pressure of seawater until the pressure in the chamber A and the chamber B is balanced.

(2) The handle 101 of the sampling assembly 1 is grasped by a robotic sampler hand, and the sampling assembly 1 is moved to a position perpendicular to the surface of the marine sediment.

(3) The sampling assembly 1 is pressed into the marine sediment by the robotic sampler hand until the sampling tube 105 is completely inserted into the marine sediment, and the seawater in the sampling tube 105 is discharged through the drainage holes 103 during the insertion of the sampling tube 105 into the marine sediment.

(4) The sampling assembly 1 is pulled out of the marine sediment by the robotic sampler hand.

(5) The sampling tube 105 of the sampling assembly 1 is aligned with and slowly inserted into the pressure maintaining cylinder 208 by the robotic sampler hand. When the lower end surface of the end cap 102 of the sampling assembly 1 contacts the floating sealing ring 204, the floating sealing ring 204 is forced to move downward, so that a seal is provided the lower end surface of the end cap 102 and the floating sealing ring 204 by an axial sealing gasket 212. When the end cap 102 continues to move downwards and slides over the square block 201, the square blocks 201 are ejected by the compression springs 211 and clamp the upper end of the end cap 102, at which time the robotic sampler hand stops the insertion operation. When the handheld robotic sampler for marine sediment with hermetic sampling is recovered from the seafloor to the sea surface, as the pressure of the external seawater is reduced, the pressure maintaining cylinder 208 will expand and deform. At this time, the inert gas in the chamber A of the pressure compensator 3 will push the piston 302 to move to the chamber B, forcing the seawater in the chamber B to flow towards the pressure maintaining cylinder 208 through the high pressure tube 4, thereby compensating for pressure loss inside the pressure maintaining cylinder 208 due to expansion and deformation of the pressure maintaining cylinder 208.

While the disclosure has been described in connection with what are presently considered to be the most practical and preferred embodiments, it is to be understood that the disclosure is not limited to the disclosed embodiments, but on the contrary, is intended to cover various modifications and equivalent arrangements included within the spirit and scope of the disclosure.

What is claimed is:

1. A mechanical handheld hermetic sampler for marine sediment, comprising a sampling assembly and a pressure keeper; wherein the sampling assembly comprises a sampling tube, a handle and an end cap; the sampling tube is fixed at a lower end surface of the end cap; the handle is fixed at an upper end surface of the end cap; a plurality of drainage holes are provided at a side wall of a top of the sampling tube; the sampling tube is insertable into the pressure keeper; and the end cap and the pressure keeper are connected in a sealed manner;

the pressure keeper comprises a pressure maintaining cylinder, square blocks, a floating sealing ring and a sample discharging valve; a side wall of a top of the pressure maintaining cylinder is provided with a plurality of square block holes; the plurality of square block holes are provided along a radial direction of the pressure maintaining cylinder; and each of the square blocks is respectively provided in each of the square block holes; block casing corresponding to each square block is fixed on an outer wall of the pressure maintaining cylinder; and each square blocks are connected with the block casing through a compression spring, so that the square blocks elastically move in the square block holes along the radial direction of the pressure maintaining cylinder;

an upper end of an inner side wall of the pressure maintaining cylinder is provided with a stepped surface, the stepped surface is provided with a plurality of blinded spring holes; axis of each of the spring holes are parallel to an axis of the pressure maintaining cylinder; floating support springs are provided in the spring holes; the floating sealing ring is supported on the floating support springs; a radial sealing gasket is provided between the floating sealing ring and an inner wall of the pressure maintaining cylinder; the square blocks are provided above the floating sealing ring; the end cap is fastened between the square blocks and the floating sealing ring; and a bottom of an inner chamber of the pressure maintaining cylinder is connected to the sample discharging valve through a first pressure-resistant tube.

2. The sampler of claim 1, wherein a limit pins is provided on a side face of each of the square blocks close to the block casing to prevent the square blocks from completely sliding into the square block holes under an action of the compression springs; and an axial sealing gasket is mounted on an upper end surface of the floating sealing ring.

3. The sampler of claim 2, wherein the handheld robotic sampler further comprises a pressure compensator; the pressure compensator comprises a pressure-resistant cylinder, a piston, a compensator end cap and an inflation valve; one end of the pressure-resistant cylinder is open and the other end of the pressure-resistant cylinder is provided with a first connecting hole in communication with the pressure maintaining cylinder; the compensator end cap is fixed at the open end of the pressure-resistant cylinder; the compensator end cap is provided with a second connecting hole; the inflation valve is in communication with the second connecting hole through a second pressure-resistant tube; and the piston is provided in the pressure-resistant cylinder.

4. A method for sampling and pressure maintaining of marine sediment using the sampler of claim 3, comprising:
grasping a handle of a sampling assembly, and moving the sampling assembly to a position perpendicular to and above a surface of the marine sediment;
pressing the sampling assembly into the marine sediment until the sampling tube is completely inserted into the marine sediment, and discharging seawater in the sampling tube through the drainage holes during insertion of the sampling tube into the marine sediment; and
pulling the sampling tube out of the marine sediment and inserting the sampling tube into the pressure keeper.

5. The method for sampling and pressure maintaining of marine sediment of claim 4, wherein the step of inserting the sampling tube into the pressure keeper:

aiming the sampling tube at the pressure maintaining tube, inserting the sampling tube into the pressure maintaining tube; and keeping pressing the sampling assembly after the sampling tube is fully inserted into the pressure maintaining tube, so that the end cap of the sampling assembly slides over the square blocks; the axial sealing gasket is provided to seal between a lower end surface of the end cap and the floating sealing ring; and the square blocks fasten an upper end of the end cap under an action of the compression springs.

6. The method for sampling and pressure maintaining of marine sediment of claim 5, wherein before the handheld robotic sampler for marine sediment with hermetic sampling is launched, a chamber clearance between the piston of the pressure compensator and the compensator end cap is filled with an inert gas through the inflation valve, and the piston is located at a top of an inner chamber of the pressure-resistant cylinder.

* * * * *